Nov. 20, 1951     J. R. LA ROSEE     2,576,023
MILLING MACHINE ATTACHMENT

Filed Dec. 4, 1948     2 SHEETS—SHEET 1

INVENTOR.
James R. LaRosee
BY Kenway, Jenney, Witter
 & Hildreth, attys.

Patented Nov. 20, 1951

2,576,023

UNITED STATES PATENT OFFICE 2,576,023

MILLING MACHINE ATTACHMENT

James R. La Rosee, Waltham, Mass.

Application December 4, 1948, Serial No. 63,574

5 Claims. (Cl. 90—19)

The present invention relates to vertical spindle attachments for horizontal spindle milling machines.

There are numerous operations which are preferably performed by a vertical spindle machine, yet which require a higher degree of precision than is generally possible with the usual drill press. On the other hand, there are many machine shops which lack a vertical spindle milling machine, but have a horizontal spindle machine that is capable of relatively precise work. It is therefore an object of the present invention to provide an attachment which may be readily mounted on a horizontal spindle milling machine to convert the same to a vertical spindle machine that is both rugged and accurate, thereby substantially extending the scope of utility of the horizontal machine.

More specifically it is an object of the invention to provide a vertical spindle attachment which may be readily mounted and demounted on a horizontal spindle machine as the occasion requires, and which may be brought into accurate and rigidly maintained vertical relation to the machine carriage.

Figure 1:
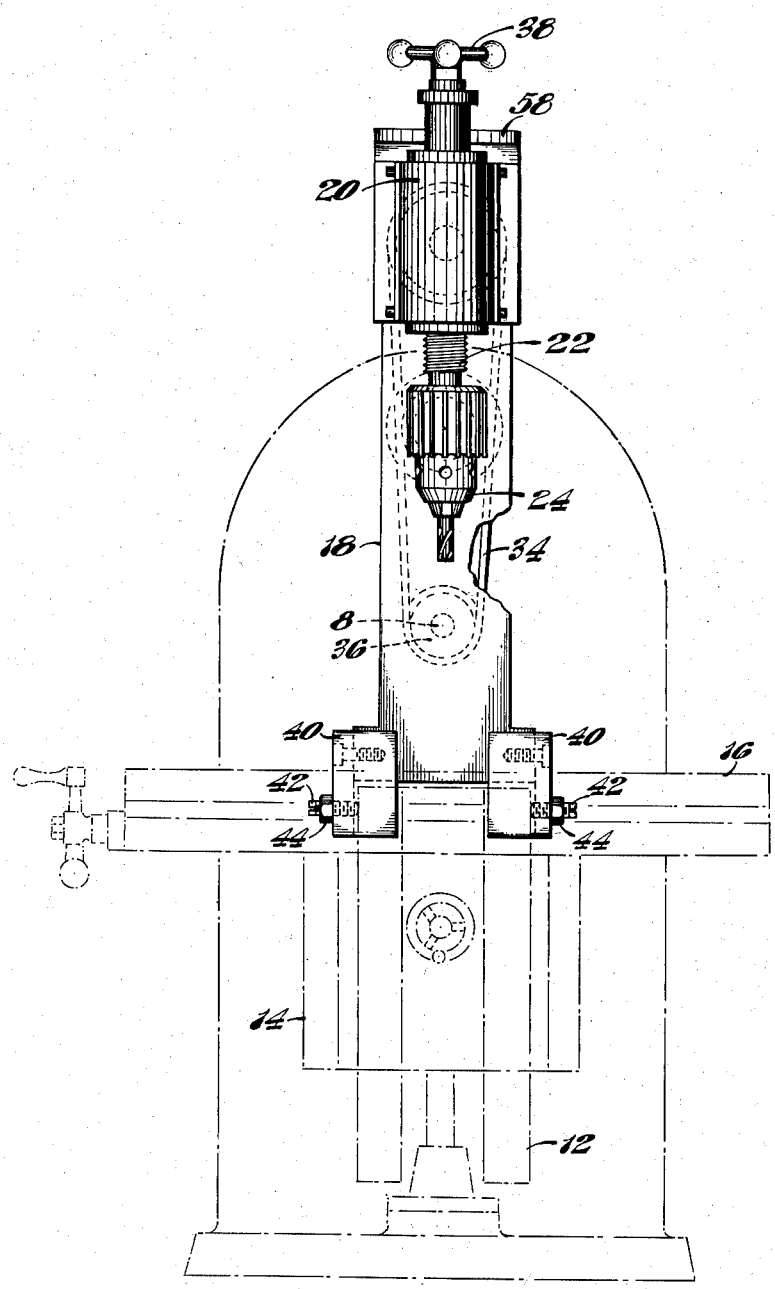
Figure 2:
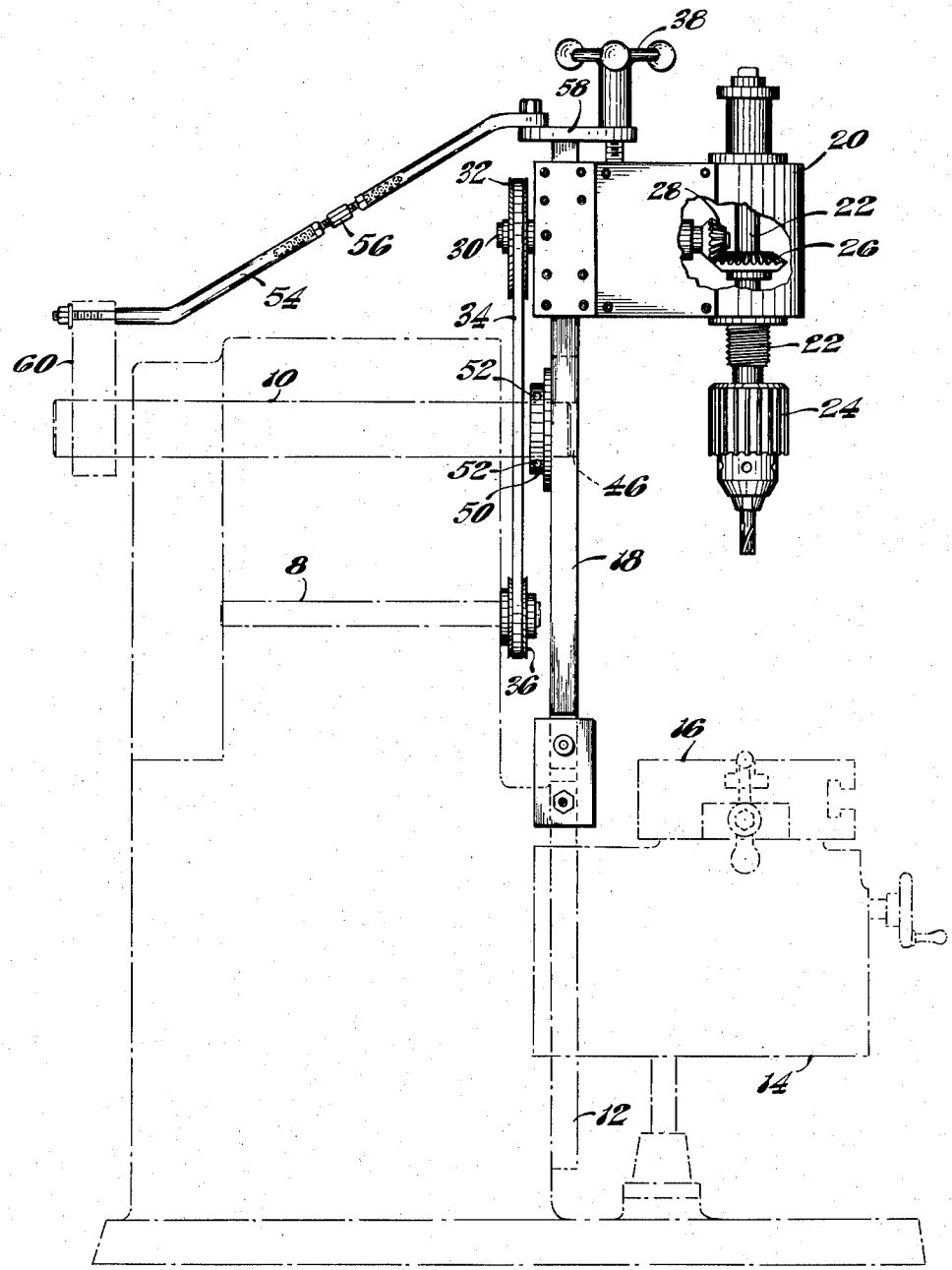

In the drawings illustrating the invention, Fig. 1 is a view in front elevation illustrating the attachment in its preferred embodiment, the machine on which the attachment is shown as mounted being illustrated in dot-and-dash outline, and Fig. 2 is a view in side elevation, a portion of the spindle housing being broken away to show the spindle driving means.

The milling machine in conjunction with which the attachment of the invention is illustrated is of typical arrangement, having a horizontal spindle 8 driven from a suitable source of power, not illustrated, and upon which the milling cutter is adapted to be mounted when the machine is to be normally used as a horizontal milling machine. Secured in the machine frame above the spindle is the usual horizontal arm 10. At the front of the machine are vertical ways 12 on which is mounted the knee 14 for vertical sliding movement, with the usual carriage or work table 16 on top of the knee.

The attachment for converting the machine to a vertical spindle device is arranged to be mounted on the machine in such a way that the spindle is located over the carriage 16 and spaced above it a sufficient distance to permit a considerable range of work to be accommodated. At the same time provision is made for mounting the attachment on the machine to permit the vertical spindle to be driven from the horizontal spindle of the machine, thus avoiding the necessity for an additional motor for driving the attachment.

The attachment comprises a vertical plate 18 which carries the vertically adjustable spindle housing 20 and spindle assembly. This assembly comprises the vertical spindle 22, journalled in the housing in appropriate bearings, the lower end of the spindle being provided with a chuck 24 or other tool holder. A beveled gear 26 on the spindle 22 is driven by pinion 28 on horizontal shaft 30 rotating on bearings within the housing. The upper portion of the plate 18 is slotted to allow the shaft to extend through to the rear of the plate. A pulley 32 on shaft 30 is adapted to be connected by belt 34 to a pulley 36 mounted on the spindle 8 of the machine in place of the milling cutter, to provide driving power to the vertical spindle of the attachment. A hand screw 38 threadably engaging the spindle housing permits the housing to be raised to tighten the belt after the belt has been placed on the pulleys.

The vertical spindle attachment is so designed that it may be readily mounted on the machine whenever the occasion requires, such mounting nevertheless being carried out in a manner that provides extreme rigidity as well as accuracy of alignment. This mounting is arranged to provide for precise adjustment both laterally and in a fore and aft direction so that the vertical spindle may be brought into accurate vertical relation to the plane of the carriage 16, after which the parts may be positively locked in adjusted position.

To support the plate 18 rigidly on the machine when the attachment is to be used, means are provided for connecting the plate to the machine at three points. At its lower end, the plate is connected to the vertical ways of the machine by means of channel blocks 40 which are bolted or otherwise secured to opposite edges of the plate. These channel blocks fit over the top ends of the ways of the machine so as to locate the plate 18 in alignment with said ways. Set screws 42 having flat points to avoid marring the ways provide for clamping connection to the ways, with lock nuts 44 to hold the set screws against loosening.

In its mid region, the plate is secured to the machine by clamping connection to the horizontal arm 10. For this purpose the plate is preferably bored at 46 to receive with some clearance the projecting end of the arm 10, and a flanged collar 50 secured to the plate is adapted to fit over and be clamped to the arm. Set screws 52 provide releasable clamping connection between the hub and the arm.

To provide full rigidity and also to permit accurate fore and aft trueing up of the vertical spindle, the top of the attachment is provided with an adjustable brace extending from the rear end of the horizontal arm 10. This brace is in the form of a diagonal strut 54 interrupted near its middle and connected by a turn screw 56 having left and right threads to permit the length of the brace to be accurately adjusted. This brace is connected at one end to a top member 58 on the plate 18, and at its other end to the yoke or bracket 60 with which the usual horizontal milling machine is equipped as an adjunct of the horizontal arm.

A description of the mode of installation of the attachment on the machine will serve to indicate the advantages possessed by the particular arrangement of connecting means. When the attachment is to be used, the milling cutter is removed from the horizontal spindle and an appropriate pulley mounted thereon. Then the attachment is brought into position with the channel blocks set over the top ends of the vertical ways of the machine. While the attachment is steadied in approximately correct position, the horizontal arm is pushed forward into the hub of the flanged member. By sliding the horizontal arm forward or back or alternatively, by moving the hub forward or backward on the horizontal arm, the attachment is brought into substantially true vertical position in a fore and aft direction. In this trueing operation it will be found helpful to use a dial test indicator carried on an arm secured in the chuck of the vertical spindle so that as the spindle is slowly rotated, variation in gage reading will indicate the lack of true vertical relation with the surface of the carriage.

After the fore and aft adjustment has been made very nearly correct, the attachment will be trued laterally, using for this purpose the set screws in the channel blocks to produce left or right movement of the base of the plate 18, as may be required. When the correct adjustment is obtained the set screws may be tightened and the lock nuts set up to retain the adjustment.

The final step in the mounting is to bring the yoke into position at the rear of the horizontal arm and make connection to the lower end of the diagonal brace 54. Final trueing in a fore and aft direction is provided by the turn screw 56, and it will be found that an extremely accurate adjustment may be made so as to insure that the spindle is precisely vertical in relation to the surface of the carriage 16. Furthermore, the vertical plate is so firmly braced by the three point connection that there is no loss of accuracy even when relatively heavy work is being undertaken.

It will be appreciated that once the initial adjustments have been made when the attachment is first installed on a machine, it will not be necessary thereafter to go through the complete procedure as outlined. If when the attachment is to be removed, but one set screw in the channel block is loosened, then the attachment may readily be replaced in substantially the correct position by retightening the single clamping set screw, and with only a slight adjustment of the turn screw 56 in the diagonal brace to provide the final trueing up in the fore and aft direction.

As a result of the three point attachment, it becomes possible to mount the vertical spindle device well above the carriage or table of the machine, and in fact above the horizontal arm of the machine, thus permitting work of substantial size to be operated upon. As far as I am aware, existing devices of this general nature have all been mounted on or below the horizontal arm and have therefore suffered from inability to accommodate work of any appreciable size, and furthermore such devices have generally been found to lack adequate rigidity for accurate work.

It will be understood that I have described the invention in what I believe to be its preferred embodiment, but my invention comprehends such other constructions and arrangements as are within the scope of the appended claims.

I claim as my invention:

1. A vertical attachment for horizontal-spindle milling machines, comprising an upright member, a rotatable spindle, means for securing the upright member to the machine comprising connections at the lower end of the upright to engage the vertical ways of the machine, a connection intermediate the ends of the upright for engaging the forward end of the horizontal arm of the machine, and a brace extending from the top of the upright rearwardly and downwardly for connection to the horizontal arm at the rear of the machine, and driving connections for actuating the spindle of the attachment from the spindle of the machine.

2. A vertical attachment for horizontal-spindle milling machines, comprising an upright member, a spindle carrier slidably adjustable along the member, a vertical spindle journalled in the carrier, means for securing the upright member to the vertical ways of the machine, means for securing the member intermediate its ends to the forward end of the horizontal arm of the machine, and a brace extending from the top of the member to the horizontal arm at the rear of the machine, said brace having screw threaded means for adjusting the length of the brace, and connections for driving the vertical spindle from the spindle of the machine.

3. A vertical attachment for horizontal milling machines, comprising an upright member, a spindle carrier vertically adjustable on said upright, a vertical spindle journalled in the carrier, driving means therefor, means for securing the upright member intermediate its ends to the forward end of the horizontal arm of the machine, means for connecting the upright member at its lower end to the top of the vertical ways of the machine, said means being adjustable to permit rotating the upright about the horizontal arm as a center into accurate vertical relationship laterally of the machine, and a brace extending from the top of the upright to the arm at the rear of the machine, said brace having screw threaded means for adjusting the length thereof to tilt the attachment into trued position fore and aft of the machine.

4. A vertical attachment for horizontal-spindle milling machines, comprising an upright member, a spindle carrier slidably adjustable along said member, a vertical spindle journalled in the carrier, means for driving the spindle, connections for securing the lower end of the upright member to the vertical ways of the machine, means for securing the upright member intermediate its ends to the forward end of the horizontal arm of the machine, and bracing means extending from the machine to the upper portion of the upright member above the connection to the horizontal arm.

5. A vertical attachment for horizontal-spindle milling machines comprising an upright member, a spindle carrier vertically adjustable along said member, a vertical spindle journalled in the carrier, means for driving the spindle, and means for mounting the upright member on the machine comprising connections for securing said member to the forward end of the horizontal arm, and bracing means extending to the machine rearwardly and downwardly from the upper portion of the upright above the connection to the horizontal arm.

JAMES R. LA ROSEE.

REFERENCES CITED

The following references are of record in the file of this patent:

UNITED STATES PATENTS

| Number | Name | Date |
|---|---|---|
| 1,397,696 | Nelson | Nov. 22, 1921 |
| 1,837,766 | Edwardsen | Dec. 22, 1931 |
| 2,367,555 | Arney | Jan. 16, 1945 |
| 2,471,780 | Sandison | May 31, 1949 |